UNITED STATES PATENT OFFICE.

WALTER ALEXANDER, OF NEW YORK, N. Y., ASSIGNOR TO NATIONAL GUM & MICA COMPANY, OF NEW YORK, N. Y., A CORPORATION OF NEW YORK.

ADHESIVE COMPOSITION AND PROCESS OF MAKING SAME.

1,263,634.        Specification of Letters Patent.      Patented Apr. 23, 1918.

No Drawing.      Application filed February 8, 1917. Serial No. 147,330.

*To all whom it may concern:*

Be it known that I, WALTER ALEXANDER, a citizen of the United States, and a resident of the borough of Manhattan, in the city, county, and State of New York, have invented and discovered a new and useful Improvement in Adhesive Compositions and Processes of Making Same, of which the following is a specification.

My invention relates to a method of treatment of the several species of gums termed generally gum acacia or gum arabic, or the like water-soluble natural gums, by the addition thereto of a small percentage of a boron derivative.

It has for its object the production of a dry product which is markedly water-absorptive, and whose penetrating, spreading, and adhesive properties are notably increased and strengthened.

It has for its further objects the production of a borated dry gum of the arabic species, suitable as a substitute for animal glue, gelatin, aqueous dextrin, modified or soluble starches, as artificial gum or British gum, and soluble adhesives generally, and which composition may be termed a super-gum, in that it has the capacity for ready incorporation with other substances and compounds, whether neutral, acid, or alkaline in reaction, permitting its employment advantageously as a universal binder even where chemical or physical conditions are present which would otherwise normally antagonize or repel these water-soluble gums.

In carrying out my invention, preferably I treat the commercial gum arabic to free it from foreign impurities by dissolving it and filtering the solution. In the case of gums containing volatile constituents or oils therewith, I drive off the non-essential ingredients by boiling. In either case I reduce the residual clear gum to a dry state and then preferably grind it to a granular or powdered form. To this pulverized gum I add a small percentage of a suitable boron compound in like form. The mixture is thoroughly agitated until a homogeneous distribution is attained. Instead of the dry process described and preferred, I may first dissolve the gum in water, add the boron compound to the solution, and then evaporate the water therefrom. The boron-treated gum resultant will be found to possess water-absorbing properties in high degree and to attain the other desired objects previously stated. As specific examples of my invention as applied to gum arabic, two formulae are recited:

I. Take 110 pounds of gum arabic dissolved in 390 pounds of water. Add to this solution four pounds of commercial borax. Agitate this mixture, preferable with low heat, until a complete solution is attained, and then evaporate the water therefrom.

II. Granulate 110 pounds of gum arabic. With this powdered gum mix four pounds of commercial borax, likewise in powdered or granular form.

The gum arabic, an acid gum, will stiffen up without neutralizing the alkalinity of the boron compound. If, on the contrary, the borax be neutralized as to its alkalinity by suitable acid, the gum arabic will nevertheless stiffen up. Similarly, if the acidity of the gum arabic has been first neutralized, the borated gum arabic will stiffen up as in the other cases. If, however, the acidity of the gum arabic or other like acid gum first be neutralized, certain oils and greases may be combined therewith, and the mixture may be emulsified. The super-gum, as I have termed it, of my discovery is apparently both a physical and chemical compound, and is characterized by its absorptive quality, having a high affinity for water.

Among the useful applications of these improved gums are their superior advantages as stiffeners, sizings, binders, and dressings for straw and straw hats; as a size and finish for fabrics; as a preservative coating, and as an adhesive adapted to general combining uses.

Having thus described the best method known to me for making, compounding, and using my inventions or discoveries, both as to processes and products, and without limiting my claims thereto save as the essential steps recited are involved in the production of a borated gum, I claim:

1. As a new article, dry borated gum.
2. As a new article, dry borated gum arabic.
3. As a new article, finely divided dry borated gum arabic.
4. The process of producing a dry composition consisting in dissolving a soluble gum of the arabic species and mixing a water-soluble boron compound therewith, and evaporating the product.

5. The process of producing compositions of the class described consisting in dissolving gum arabic, dissolving a water-soluble boron compound therewith, and driving off the water from the solution.

6. The process of producing compositions of the class described consisting in dissolving gum arabic, mixing borax therewith, and drying the mixture.

WALTER ALEXANDER.